(12) United States Patent
Pelayo

(10) Patent No.: US 8,286,502 B2
(45) Date of Patent: *Oct. 16, 2012

(54) ELECTROMAGNET FLOWMETER HAVING A MEASURING TUBE WITH A VARYING CROSS SECTION

(75) Inventor: Juan Carlos Gonzalez Pelayo, Meteren (NL)

(73) Assignee: Krohne AG, Basel (CH)

( * ) Notice: Subject to any disclaimer, the term of this patent is extended or adjusted under 35 U.S.C. 154(b) by 217 days.

This patent is subject to a terminal disclaimer.

(21) Appl. No.: 12/619,005

(22) Filed: Nov. 16, 2009

(65) Prior Publication Data

US 2010/0132478 A1    Jun. 3, 2010

(30) Foreign Application Priority Data

Nov. 17, 2008 (DE) .......................... 10 2008 057 756

(51) Int. Cl.
*G01F 1/58*   (2006.01)

(52) U.S. Cl. ................................................... 73/861.12

(58) Field of Classification Search ........................ None
See application file for complete search history.

(56) References Cited

U.S. PATENT DOCUMENTS

| | | | | |
|---|---|---|---|---|
| 4,253,340 A * | 3/1981 | Schmoock | ................. | 73/861.12 |
| 4,679,442 A * | 7/1987 | Kubota | ....................... | 73/861.12 |
| 6,817,249 B2 * | 11/2004 | Yamazaki | ................... | 73/861.12 |
| 7,228,748 B2 * | 6/2007 | Keech et al. | ................ | 73/861.12 |
| 7,318,354 B2 * | 1/2008 | Visser et al. | ................ | 73/861.12 |
| 2006/0213284 A1 * | 9/2006 | Visser et al. | ................ | 73/861.12 |
| 2010/0126282 A1 * | 5/2010 | Neuburger et al. | ......... | 73/861.12 |

* cited by examiner

*Primary Examiner* — Harshad R Patel
(74) *Attorney, Agent, or Firm* — Roberts Mlotkowski Safran & Cole, P.C.; David S. Safran

(57) ABSTRACT

An electromagnetic flowmeter for mass flow measurement of a flowing medium having a measuring tube, a magnetic field generator for generating a magnetic field at least partially passing through the measuring tube, having two electrodes for tapping into a measurement voltage induced in the flowing medium and having a housing incorporating the measuring tube, the magnetic field generator and the electrodes, wherein the measuring tube has a cross section that varies along its length and the cross section in the mid-section of the measuring tube is smaller than at its ends, preferably the cross section of the measuring tube being rectangular in its mid-section, optionally also square, and wherein the housing preferably has a circular cross section. At least one reinforcement, preferably two, is provided in the mid-section of the measuring tube joining the measuring tube and the housing.

19 Claims, 3 Drawing Sheets

ELECTROMAGNET FLOWMETER HAVING A MEASURING TUBE WITH A VARYING CROSS SECTION

BACKGROUND OF THE INVENTION

1. Field of Invention

The invention relates to a electromagnetic flowmeter for flow measurement of a flowing medium having a measuring tube, having a magnetic field generating means for generating a magnetic field at least partially flowing through the measuring tube, having two electrodes for tapping into a measurement voltage induced in the flowing medium and having a housing incorporating the measuring tube, preferably also the magnetic field generating means and the electrodes, wherein the measuring tube has a cross section that varies along its length and the cross section in the mid-section of the measuring tube is smaller than at the ends of the measuring tube, wherein the housing preferably has a circular cross section.

2. Description of Related Art

Electromagnetic flowmeters are extensively known from decades of prior art; here the reference "Technische Durchflußmessung" (Technical Flow Measurement) by Prof. Dr.-Ing. K. W. Bonfig, 3. Edition, Vulkan-Verlag Essen, 2002, pages 123 to 167 is referred to as an example.

The basic principle of electromagnetic flowmeter for flow measurement of a flowing medium goes back to Faraday, who had already suggested in the year 1832 using the principle of electrodynamic induction for measuring the rate of flow of a flowing medium. According to Faraday's law of induction, an electric field strength perpendicular to the direction of flow and to the magnetic field arises in a flowing medium, which carries charge carriers with it and flows through a magnetic field. Faraday's law of induction is used in the case of an electromagnetic flowmeter in that a magnet field generating means, regularly composed of two magnetic coils, generates a magnetic field and at least partially lead through the measurement tube, wherein the generated magnetic field has at least one component that runs perpendicular to the direction of flow. Within this magnetic field, each volume element of the flowing medium moving through the magnetic field and having a certain number of charge carriers together with the field strength arising in this volume element makes a contribution to the measurement voltage tapped by the measuring electrodes.

SUMMARY OF THE INVENTION

When, as is described above, electromagnetic flowmeters have been known extensively for decades and exist in a hardly manageable plurality of embodiments, then, as in many further developed fields of technology, further developments are still desired and possible. Therefore, the object of the invention is to improve the electromagnetic flowmeter described above in its basic construction according to very different factors that are of importance alone or also in their entirety.

The electromagnetic flowmeter according to the invention is characterized first in that at least one reinforcement is provided in the mid-section of the measuring tube joining the measuring tube with the housing. This allows that, on the one hand, the measuring tube, and on the other hand, the housing can be constructively very differently designed and executed in the electromagnetic flowmeter according to the invention. This allows for flow-related as well as induction-related considerations to prevail in the design and execution of the measuring tube, while mechanical considerations are generally prevalent in the design and execution of the housing. For this reason, in the mid-section of the measuring tube according to the invention, a reinforcement joins the measuring tube to the housing, the measuring tube can then have the necessary pressure tolerance that would not exist without the reinforcement provided according to the invention.

The reinforcement joining the measuring tube with the housing provided in the mid-section of the measuring tube according to the invention can be designed differently, in particular, at least one support—between the measuring tube and the housing—can be provided as reinforcement in the mid-section of the measuring tube.

In particular then, but not only then, when one and only one support is provided as reinforcement between the measuring tube and the housing in the electromagnetic flowmeter according to the invention, it can be advisable to provide a reinforcing ring encompassing the measuring tube at the mid-section of the measuring tube and to join the measuring tube with the housing via the reinforcing ring and the reinforcement, optionally, via the support provided as reinforcement.

If only one support as reinforcement can be provided between the measuring tube and the housing in an electromagnetic flowmeter according to the invention, such an asymmetrical construction is not advised. Moreover, at least two supports joining the measuring tube and the housing are preferably provided.

It was indicated above that a reinforcing ring encompassing the measuring tube in the mid-section of the measuring tube could be provided in an electromagnetic flowmeter according to the invention. Additionally—or alternatively—the housing can also be provided with a reinforcement ring—arranged inside or outside—in its mid-section.

If at least one support as reinforcement is provided in the mid-section of the measuring tube joining the measuring tube with the housing in the electromagnetic flowmeter according to the invention, there are many possibilities for constructively and/or functionally designing this support or—if more are intended—supports. It is of particular advantage to design the support—when multiple supports are intended, at least individual supports or also all supports—as a hollow cylinder, preferably as a circular hollow cylinder. Such a design allows for the possibility of providing magnetic coils of the magnetic field generating means on the supports joining the measuring tube to the housing or within these supports and/or of arranging the electrodes tapping the induced voltage within the supports joining the measuring tube to the housing.

In the electromagnetic flowmeter, the measuring tube, as is usual, can represent the flow channel for flowing media whose flow is to be measured. A particularly preferred design of the electromagnetic flowmeter according to the invention is implemented, however, differently from the above-mentioned, usual design. This design is characterized, namely, in that at least one measuring tube formation member is provided within the housing, preferably two measuring tube formation members are provided and the measuring tube member or, respectively the measuring tube formation members form or, respectively form the measuring tube together with a part of the inner surface of the housing. In this particularly preferred design of an electromagnetic flowmeter according to the invention, the measuring tube formation member does not form or, respectively the measuring tube formation members do not form on their own a flow channel for the flowing medium, whose flow is to be measured. Rather, in this design, the flow channel comprises the measuring tube formation member or, respectively of the measuring tube formation members and a portion of the inner surface of the housing of the measuring tube, i.e. the flow channel for the flowing medium. This design has the advantage, primarily, that the measuring tube formation member or, respectively measuring tube formation members can be formed in a particularly easy manner, in particular in consideration of flow-related and/or induction-related—and, thus, measurement-related—demands. Primarily, this design offers the advantage of evenly designing the measuring tube, specifically: the measuring tube formation member in the mid-section in an easy manner, i.e., there, where the electrodes normally are. However, there is the possibility of designing the measuring tube, specifically: the measuring tube formation member in the mid-section, i.e. there, where the electrodes normally are, with a radius of curvature that is greater than the radius of curvature of the housing.

According to an additional teaching of the present invention that has inventive importance independent of that what is described above, the measuring tube functionally comprises multiple sections with preferably different radiuses of curvature. The term "functionally" shall thereby express that the measuring tube can be formed as multiple pieces as well as one piece; preferably the measuring tube is formed as one piece.

For the last described embodiment of an electromagnetic flowmeter according to the invention, the measuring tube preferable functionally comprises three sections, namely, a mid-section and respectively an end section adjacent to the mid-section. Thereby the end sections represent the inlet of the flow respectively the outlet of the flow.

More favorable is possibly an embodiment in that the measuring tube functionally comprises five sections, namely a mid-section, respectively a transitional section adjacent to the mid-section and respectively an end section adjacent to the transitional sections.

For the last described embodiment of an electromagnetic flowmeter according to the invention, the particular sections may have, as already described, different radiuses of curvature. For the case that the measuring tube functionally comprises three sections, an embodiment is recommended, in which the radius of curvature of the mid-sections is greater than the radius of curvature of the end sections. For a measuring tube consisting functionally of five sections, an embodiment is recommended, in which the radius of curvature of the mid-section is also greater than the radius of curvature of the transitional sections. Thereby an embodiment is possibly recommended, in which the end sections have a radius of curvature that goes to infinity and are arranged adjacent to the transitional sections preferably with an angle of 40° to 50°, in particular of about 45° relative to the center line of the measuring tube.

For electromagnetic flowmeters, a fitting length as short as possible, a decrease of pressure as low as possible and a minor deforming caused by the pressure of the flowing medium are desired. This triple objective requires compromises. Under consideration of the depicted objective, the last described embodiment, thus the embodiment, in which the measuring tube functionally comprises multiple sections with preferably different radiuses of curvature, is an improvement.

From another point of view, a preferred embodiment of the electromagnetic flowmeter according to the invention is characterized in that the wall thickness of the measuring tube or, respectively, the measuring tube formation member or the measuring tube formation members in the mid-section is less than at the ends. Here, there is a conflict of interests. On the one hand, the wall thickness of the measuring tube or, respectively, the measuring tube formation member or measuring tube formation members should be particularly small in the mid-section of the measuring tube, because such a particularly small wall thickness leads to the measuring tube or, respectively, the measuring tube formation member or the measuring tube formation members in the mid-section of the measuring tube being able to be formed in an easy manner, which is to be aspired in a flow-related and induction-related, and, thus, in total in a measurement-related point of view. On the other hand, however,—under consideration of the pressure existing in the measuring tube—a certain pressure tolerance of the measuring tube is required, also in the mid-section. This conflict of interests is solved for the most part in that in an electromagnetic flowmeter according to the invention, as described above, is provided with at least one reinforcement joining the measuring tube and the housing in the mid-section of the measuring tube.

There is at least one reinforcement joining the measuring tube with the housing in the mid-section of the measuring tube, as repeatedly described, in the electromagnetic flowmeter according to the invention, preferably designed as at least one support. Then, when the wall thickness of the measuring tube or, respectively the measuring tube formation member or the measuring tube formation members is less in the mid-section than at the beginning of the measuring tube or at its end, in particular, then, when the wall thickness is relatively small in total, but not only then, a certain design is recommended that is characterized in that the measuring tube or, respectively, the measuring tube formation member or the measuring tube formation members has, respectively, have a terminating member serving to support the support ring, respectively, the measuring support member, respectively, the support.

It has been described above that the magnetic field generating means of an electromagnetic flowmeter normally has two magnetic coils. Then, in the last design described of an electromagnetic flowmeter according to the invention, the support members can be executed as passageways belonging to the magnetic coils of the magnetic field generating means.

For electromagnetic flowmeters, a non-magnetic material is normally used for the measuring tube. This can, in principle, be plastic, however, non-rusting steel, i.e., stainless steel, is often used. The measuring tube or, respectively the measuring tube formation member or measuring tube formation members in the electromagnetic flowmeter according to the invention can also consist of non-rusting steel, however, the use of magnetically soft steel is also possible.

As is typical in electromagnetic flowmeters, it is advisable also in electromagnetic flowmeters according to the invention to provide on the inside at least partially an electrically insulating surface layer, and then, when an electrically insulating surface layer is only partially provided, in the area of the electrodes. However, there are many reasons for also providing an electromagnetic flowmeter according to the invention completely with an electrically insulating surface layer.

In respect to the construction and the production-related implementation, it is finally provided for the electromagnetic flowmeter according to the invention that the measuring tube or, respectively, the measuring tube formation member or measuring tube formation members is, respectively, are shorter than the housing and/or the measuring tube or, respectively, the measuring tube formation member or measuring tube formation members and the housing are connected to one another by means of welding.

In detail, there are many possibilities for implementing or, respectively, designing and/or further developing the electromagnetic flowmeter according to the invention. As will be apparent from the following detailed description in conjunction with the drawings.

DETAILED DESCRIPTION OF THE INVENTION

The electromagnetic flowmeter shown in the figures—essentially only schematically—is determined for flow measurement of a flowing medium; it has, necessary for the function, a first measuring tube 1, a magnetic field generating means (not shown) for generating a magnetic field at least partially pushing through the measuring tube 1, to which to magnetic coils (not shown) belong, and two electrodes (also not shown) for tapping a measuring voltage induced in the flowing medium. Further, a housing 2, accommodating the measuring tube 1, the magnetic field generating means and the electrodes, that has a circular cross section and is provided with flanges 3, 4 on both ends belongs to the electromagnetic flowmeter shown in the figures.

For the electromagnetic flowmeter according to the invention that, in the mid-section of the measuring tube 1, at least one reinforcement is provided joining the measuring tube 1 and the housing 2. Preferably, at least one support is provided as reinforcement. In particular, then, but not only then, when one and only one support is provided, it can be advised (but is not shown) to provide a support ring encompassing the measuring tube in the mid-section of the measuring tube and to join the measuring tube to the housing via the support ring and the reinforcement, optionally i.e., via the support provided as reinforcement.

In fact, only one support as reinforcement can be provided between the measuring tube and the housing in an electromagnetic flowmeter according to the invention, however, such an asymmetrical construction is not advised. Instead, two supports 5, 6 are provided joining the measuring tube 1 and the housing 2, as is shown in the figures.

It has already been discussed above, that a support ring encompassing the measuring tube in the mid-section of the measuring tube can be provided in an electromagnetic flowmeter according to the invention. The housing can also be reinforced, and in such a manner that it is provided with a support ring—arranged inside or outside—in its mid-section, which is not shown in the figures.

Figure 1:
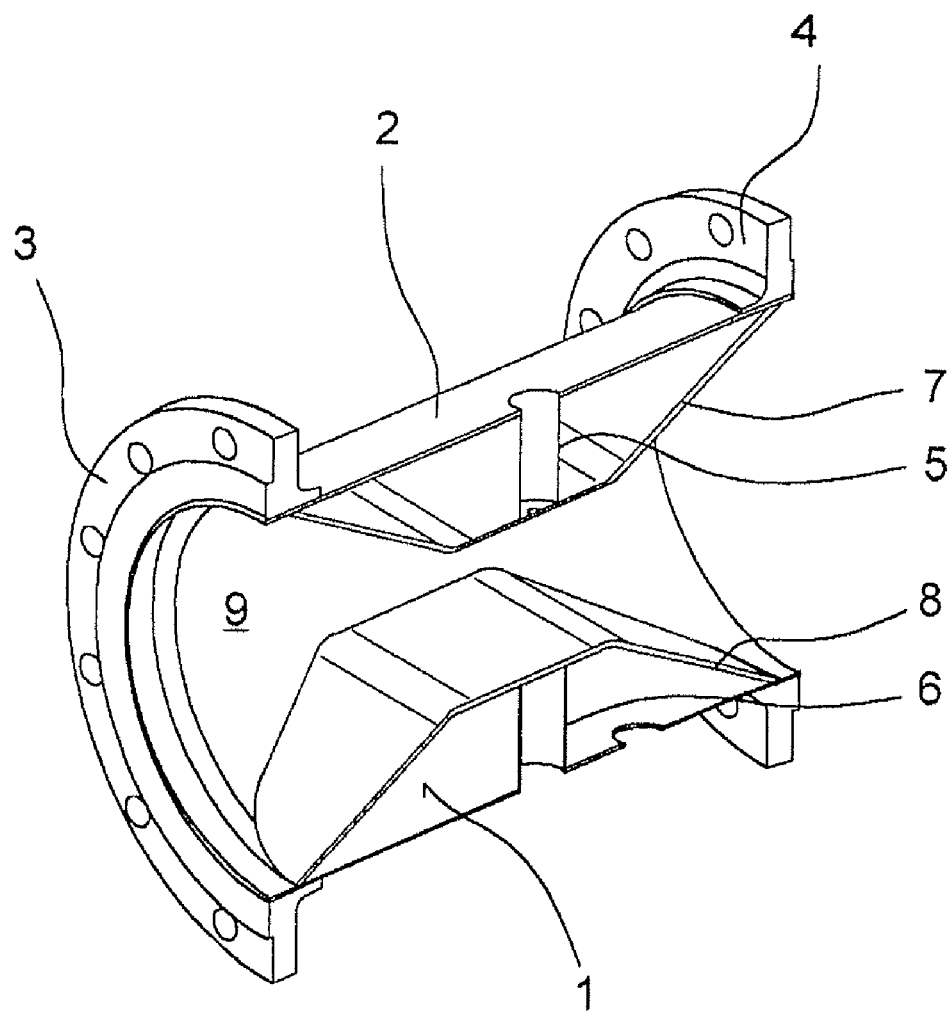
FIG. 1 is a perspective and highly schematic, an longitudinal section through a preferred embodiment of a electromagnetic flowmeter according to the invention.
Figure 2:
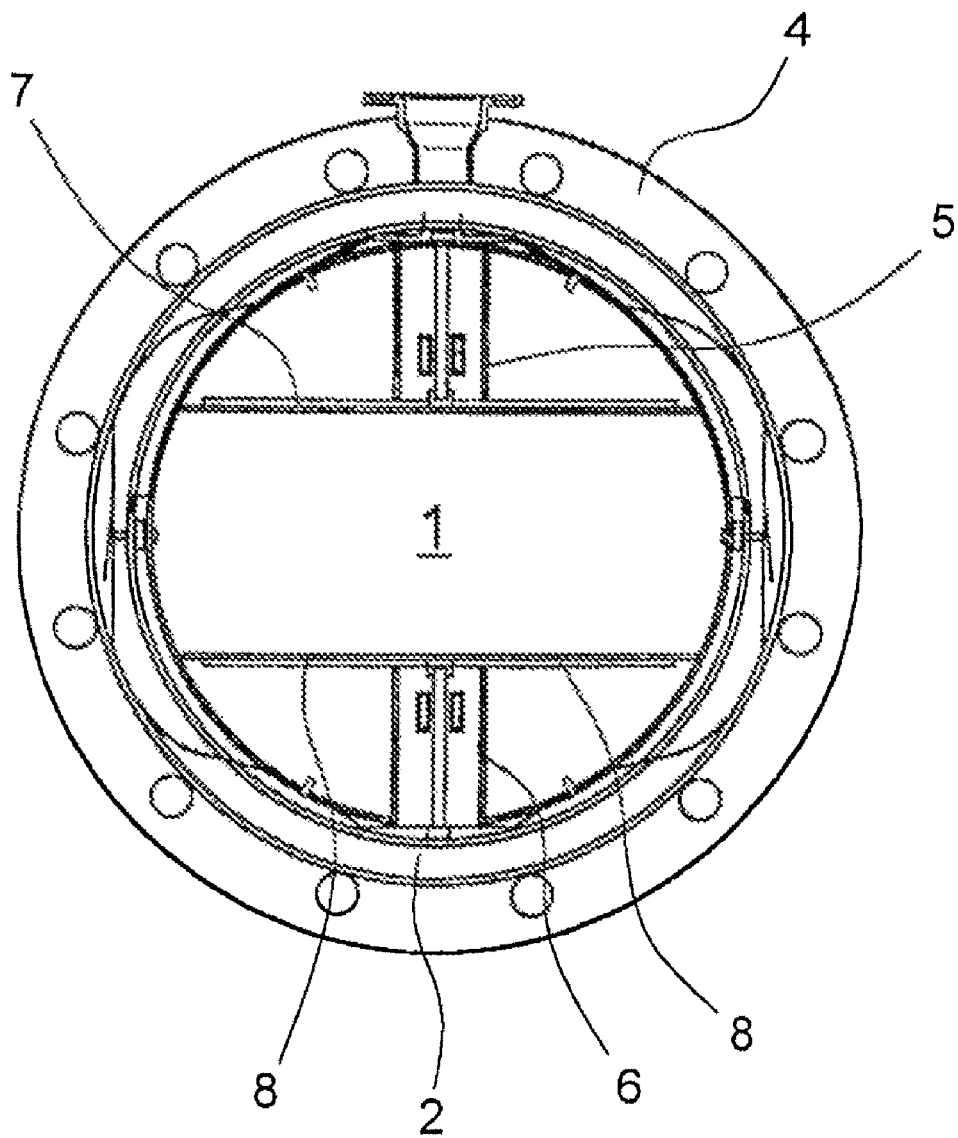
FIG. 2 is a transverse sectional view of a preferred embodiment of a measuring tube of an electromagnetic flowmeter according to the present invention.

As is shown in FIG. 1 as well as in FIG. 2, for the illustrated embodiment of an electromagnetic flowmeter according to the invention, the supports 5, 6 are designed as circular hollow cylinders. That allows for the possibility—not shown—of providing magnetic coils belonging to the magnetic field generating means on the supports or—depending on the design—within the supports and/or of providing the electrodes within the supports.

In an electromagnetic flowmeter according to the invention, the measuring tube can, as is normal, represent the flow channel for flowing media, whose flow is to be measured. In the figures, in particular in FIG. 1, however, a preferred embodiment of the electromagnetic flowmeter according to the invention is shown that deviates from the above-mentioned, normal design, which is characterized in that two measuring tube formation members 7, 8 are provided inside the housing 2 and, together with a part of the inner surface of the housing 2, the measuring tube formation members 7, 8 form the measuring tube 1. In this particularly preferred embodiment of an electromagnetic flowmeter according to the invention, the measuring tube formation members 7, 8 do not form for themselves the flow channel for the flowing medium, whose flow is to be measured, i.e., not the measuring tube 1 for themselves.

Instead, the measuring tube 1 in this embodiment comprises the measuring tube formation members 7, 8 and a part of the inner surface 9 of the housing 2. This has the advantage, above all, that the measuring tube formation members 7, 8 can be formed in a particularly simple manner, in particular in consideration of flow-related and/or induction-related—and thus with measurement-related—demands. This embodiment offers, above all, the possibility of evenly designing the measuring tube 1, specifically: the measuring tube formation members 7, 8 in the mid-section in a simple manner, i.e., there, where the electrodes normally are, as is shown in the figures. What is not shown, is the possibility of designing the measuring tube, specifically: the measuring tube formation member in the mid-section, i.e., there, where the electrodes normally are, with a radius of curvature that is greater than the radius of curvature of the housing.

Figure 3:
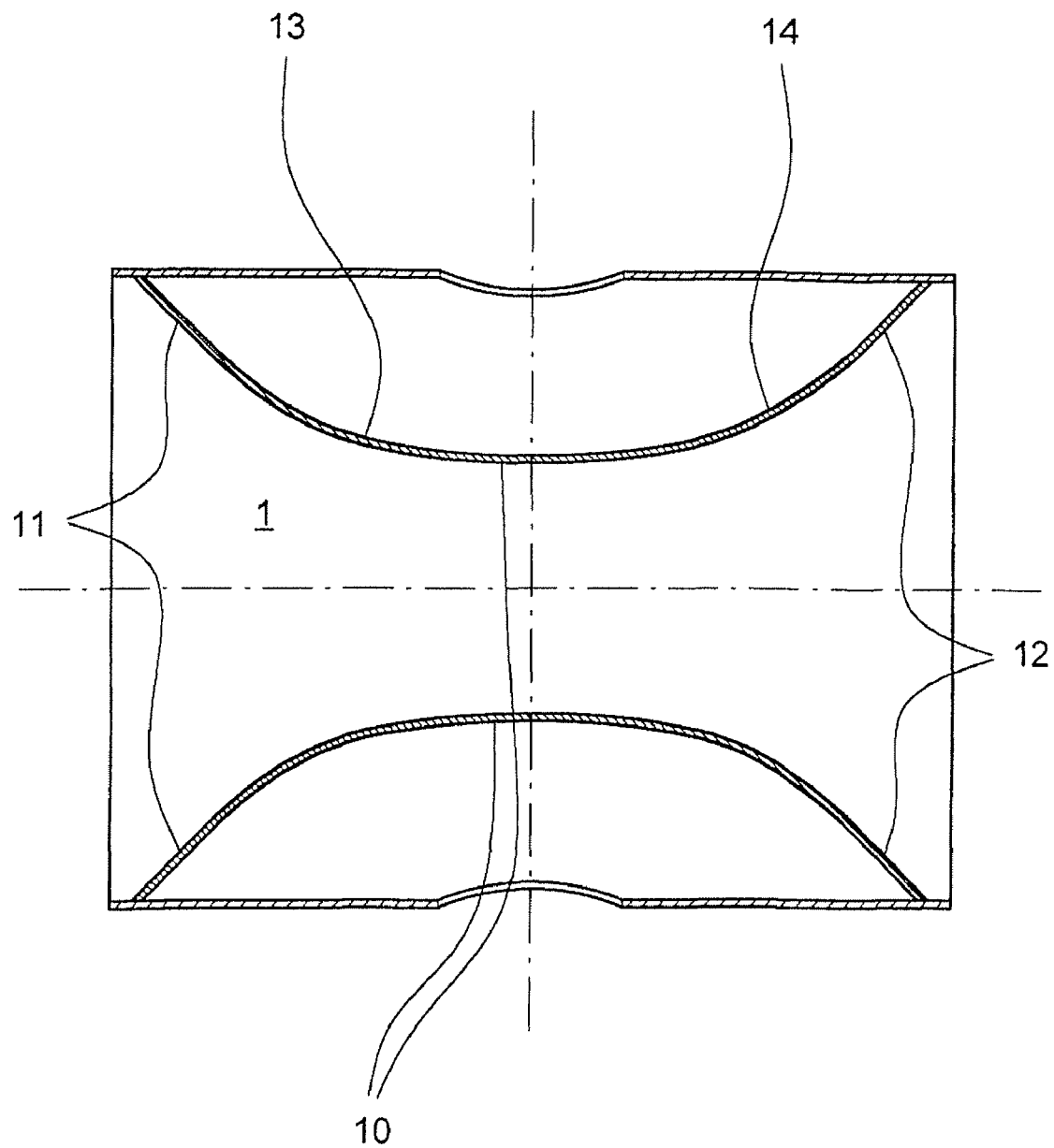
FIG. 3 is a longitudinal sectional view of another preferred embodiment of a measuring tube of an electromagnetic flowmeter according to the invention.

As described further above, an additional teaching of the invention of particular importance is characterized in that the measuring tube 1 in a lenghtwise direction functionally comprises multiple sections with different radii of curvature. In detail, the measuring tube 1 can functionally comprise three sections, namely a mid-section 10 and respectively an end section 11, 12 adjacent to the mid-section 10. The embodiment depicted in FIG. 3 goes beyond. In this embodiment, the measuring tube 1 functionally comprises five sections, namely a mid-section 10, respectively a transitional section 13, 14 adjacent to the mid-section 10 and respectively an end section 11, 12 adjacent to the transitional sections 13, 14. In detail, it is essential that the radius of curvature of the mid-section 10 is greater than the radius of curvature of the transitional sections 13, 14 that the end sections 11, 12 have a radius of curvature that goes to infinity and that the end sections 11, 12 are arranged adjacent to the transitional sections 13, 14 with an angle of about 40° to 50°, preferably of about 45° to the center line of the measuring tube 1.

An embodiment of the electromagnetic flowmeter according to the invention that is not shown in the figures, but is of particular importance is one in which the wall thickness of the measuring tube 1 is smaller in the mid-section than at the beginning of the measuring tube 1 and at its end. According to such an embodiment, there is a conflict of interests. On the one hand, the wall thickness of the measuring tube 1 or, respectively, the measuring tube formation members 7, 8 should—also—be particularly small in the mid-section of the measuring tube 1, because at a particularly small wall thickness, the measuring tube 1 or, respectively, the measuring tube formation members 7, 8 can be formed in a particularly simple manner as is intended in a flow-related and induction-related, and thus, measurement-related point of view. Since a certain pressure exists in the measuring tube, a certain pressure tolerance of the measuring tube 1 in the mid-section is, on the other hand, also necessary. According to the invention, this conflict of interests is solved, namely, in that at least one reinforcement joining the measuring tube 1 and the housing 2 is provided in the mid-section of the measuring tube 1 in the electromagnetic flowmeter according to the invention, in the embodiment, two supports 5, 6 as reinforcement are provided between the measuring tube 1 and the housing 2.

Finally, please take note that what is not shown in the figures in detail is that the measuring tube 1 can be provided at least partially with an electrically insulating surface layer, the measuring tube 1 or, respectively, the measuring tube formation elements 7, 8 can be shorter than the housing 2 and/or that the measuring tube 1 or, respectively, the measuring tube formation members 7, 8 and the housing 2 can be connected to one another by means of welding.

What is claimed is:

1. Electromagnetic flowmeter for flow measurement of a flowing medium, comprising:
    a measuring tube,
    a magnetic field generating means for generating a magnetic field at least partially passing through the measuring tube,
    electrodes for tapping into a measurement voltage induced in the flowing medium, and
    a housing incorporating the measuring tube, the magnetic field generating means and the electrode,
    wherein the measuring tube has a cross section that varies along its length with the cross section in a mid-section of the measuring tube being smaller than at ends thereof, and
    wherein at least one reinforcement is provided joining the measuring tube and the housing in the mid-section of the measuring tube; and
    wherein the measuring tube has sufficient pressure tolerance only in conjunction with the reinforcement and the housing.

2. Electromagnetic flowmeter according to claim 1, wherein the reinforcement comprises at least one support joining the measuring tube to the housing.

3. Electromagnetic flowmeter according to claim 2, wherein said at least one support comprises at least two supports joining the measuring tube to the housing.

4. Electromagnetic flowmeter according to claim 3, wherein each support is a hollow cylinder.

5. Electromagnetic flowmeter according to claim 4, wherein the electrodes are provided within the supports joining the measuring tube and the housing.

6. Electromagnetic flowmeter according to claim 3, wherein the magnetic field generating means has magnetic coils, the magnetic coils being provided on or in the supports joining the measuring tube and the housing.

7. Electromagnetic flowmeter according to 6, wherein the supports form pole shoes for the magnetic coils of the magnetic field generating means.

8. Electromagnetic flowmeter according to claim 1, wherein a support ring surrounds the measuring tube in the mid-section thereof, the measuring tube being joined to the housing via the support ring and the reinforcement.

9. Electromagnetic flowmeter according to claim 1, characterized in that the housing is provided with a support ring that surrounds the measuring tube.

10. Electromagnetic flowmeter according to claim 1, wherein at least one measuring tube formation member is provided within the housing and wherein the measuring tube formation member forms the mid-section of the measuring tube together with a part of an inner surface of the housing.

11. Electromagnetic flowmeter according to claim 10, wherein said at least one measuring tube formation member comprises at least two measuring tube formation members.

12. Electromagnetic flowmeter according to claim 1, wherein the measuring tube has a wall thickness in the mid-section that is smaller than at the ends of the measuring tube.

13. Electromagnetic flowmeter for flow measuring of a flowing medium, comprising:
    a measuring tube,
    a magnetic field generating means for generating a magnetic field at least partially passing through the measuring tube,
    electrodes for tapping into a measurement voltage induced in the flowing medium, and
    a housing incorporating the measuring tube, the magnetic field generating means and the electrode,
    wherein the measuring tube has a cross section that varies along its length with the cross section in a mid-section of the measuring tube being smaller than at ends thereof, and
    wherein the measuring tube in a lenghtwise direction functionally comprises multiple sections with different radii of curvature.

14. Electromagnetic flowmeter according to claim 13, wherein the measuring tube functionally comprises three sections a mid-section and an end section adjacent each of opposite sides of the mid-section.

15. Electromagnetic flowmeter according to claim 14, wherein the mid-section has a radius of curvature that is greater than that of the end sections.

16. Electromagnetic flowmeter according to claim 13, wherein the measuring tube functionally comprises five sections, the five sections being a mid-section, a transitional section adjacent each of opposite sides of the mid section and an end section adjacent to each of opposite sides of the transitional sections.

17. Electromagnetic flowmeter according to claim 16, wherein the mid-section has a radius of curvature that is greater than that of the end sections and the transitional sections.

18. Electromagnetic flowmeter according to claim 13, characterized in that the end sections have a radius of curvature that goes to infinity and are arranged adjacent to the transitional sections at an angle of about 40° to 50° relative to a center line of the measuring tube.

19. Electromagnetic flowmeter according to claim 13, wherein the measuring tube has a support member supporting a support ring.

* * * * *